(12) United States Patent  
Miyawaki

(10) Patent No.: US 10,333,122 B2  
(45) Date of Patent: Jun. 25, 2019

(54) ENERGY STORAGE APPARATUS

(71) Applicant: GS Yuasa International Ltd., Kyoto-shi, Kyoto (JP)

(72) Inventor: Yasutaka Miyawaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 191 days.

(21) Appl. No.: 15/216,175

(22) Filed: Jul. 21, 2016

(65) Prior Publication Data

US 2017/0033343 A1 Feb. 2, 2017

(30) Foreign Application Priority Data

Jul. 30, 2015 (JP) .................. 2015/151214

(51) Int. Cl.
  *H01M 2/12* (2006.01)
  *H01G 9/12* (2006.01)
  *H01G 9/26* (2006.01)

(52) U.S. Cl.
  CPC ............ *H01M 2/1252* (2013.01); *H01G 9/12* (2013.01); *H01G 9/26* (2013.01); *H01M 2/12* (2013.01); *H01M 2/1223* (2013.01); *H01M 2/1264* (2013.01); *H01M 2/1294* (2013.01)

(58) Field of Classification Search
  CPC .... H01M 2/1252; H01M 2/12; H01M 2/1223; H01M 2/1264; H01M 2/1294; H01G 9/12; H01G 9/26
  See application file for complete search history.

(56) References Cited

U.S. PATENT DOCUMENTS

| 2013/0057074 A1 | 3/2013 | Takano |
| 2014/0322566 A1 | 10/2014 | Kim |
| 2016/0064999 A1 | 3/2016 | Takano |

FOREIGN PATENT DOCUMENTS

| CN | 202268403 U | 6/2012 |
| EP | 2475028 A1 | 7/2012 |
| JP | 5084023 | 11/1993 |
| JP | 2009016076 A2 | 1/2009 |
| JP | 2013055748 A2 | 3/2013 |
| JP | 2013114952 A2 | 6/2013 |
| JP | 2013120690 A2 | 6/2013 |
| JP | 2013196851 A2 | 9/2013 |
| JP | 2014-135247 | 7/2014 |
| JP | 2014160571 A2 | 9/2014 |
| JP | 2014192365 A2 | 10/2014 |
| JP | 2014197452 A2 | 10/2014 |
| JP | 2014197512 A2 | 10/2014 |

(Continued)

OTHER PUBLICATIONS

European Search Report dated Nov. 9, 2016 in the corresponding European patent application No. 16181576.6.

*Primary Examiner* — Raymond Alejandro
(74) *Attorney, Agent, or Firm* — Rankin, Hill & Clark LLP

(57) ABSTRACT

Disclosed is an energy storage apparatus which includes: an energy storage device; an outer case which accommodates the energy storage device; a partition plate which is disposed between the energy storage device and a side wall of the outer case; and a discharge portion which is disposed on the outer case, the discharge portion having one or more openings through which a gas, which has passed through a flow passage formed between the partition plate and the side wall, is discharged from the outer case.

16 Claims, 9 Drawing Sheets

(56) References Cited

FOREIGN PATENT DOCUMENTS

| JP | 2014216315 | A2 | 11/2014 | |
|----|------------|----|---------|--|
| WO | 2013018151 | A1 | 2/2013 | |
| WO | 2014065110 | A1 | 5/2014 | |
| WO | WO 2014/065110 | * | 5/2014 | ............ H01M 2/12 |

* cited by examiner

ENERGY STORAGE APPARATUS

CROSS-REFERENCE TO RELATED APPLICATIONS

This application claims the benefit of Japanese patent application No. 2015-151214, filed on Jul. 30, 2015, which is incorporated by reference.

FIELD

The present invention relates to an energy storage apparatus provided with an energy storage device and an outer case which accommodates the energy storage device.

BACKGROUND

In an energy storage apparatus provided with one or more energy storage devices, there has been known the configuration in which a gas is discharged to the outside from a discharge valve provided to each energy storage device.

For example, JP-A-2013-196851 discloses an energy storage apparatus which includes: a battery accommodating body; a power conditioner; and a housing which accommodates the battery accommodating body and the power conditioner. In such an energy storage apparatus, a ventilation port provided with a waterproof ventilation film is formed on a bottom portion of the housing, and the inside of the housing communicates with outside air through a waterproof ventilation film. With such a configuration, when an unpredictable phenomenon such as natural disaster or fire occurs, a combustible gas generated in the housing can be discharged to the outside through the ventilation port.

An energy storage apparatus for power storage use or power source use is used in various regions and conditions. From viewpoints of manufacturing efficiency, a manufacturing cost and easiness of installation or maintenance, it is not desirable that the structure of the energy storage apparatus becomes complicated.

As described in JP-A-2013-196851, when the waterproof ventilation film is mounted on the ventilation port of the housing, it is necessary to select a material such as a resin porous film sheet which forms the waterproof ventilation film. Further, an operation such as working of the material and fixing of the waterproof ventilation film to a ventilation port become necessary. When a through hole is simply formed in the outer case for discharging a gas, which has discharged from an discharge valve of the energy storage device, from the outer case which accommodates the energy storage device, there is a possibility that a foreign substance such as rainwater flows into the inside of the outer case through the through hole.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an energy storage apparatus provided with an energy storage device and an outer case which accommodates the energy storage device, wherein the energy storage apparatus can enhance safety with the simple configuration.

According to an aspect of the present invention, there is provided an energy storage apparatus which includes: an energy storage device; an outer case which accommodates the energy storage device; a partition plate which is disposed between the energy storage device and a side wall of the outer case; and a discharge portion which is disposed on the outer case, the discharge portion having one or more openings through which a gas, which has passed through a flow passage formed between the partition plate and the side wall, is discharged from the outer case.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
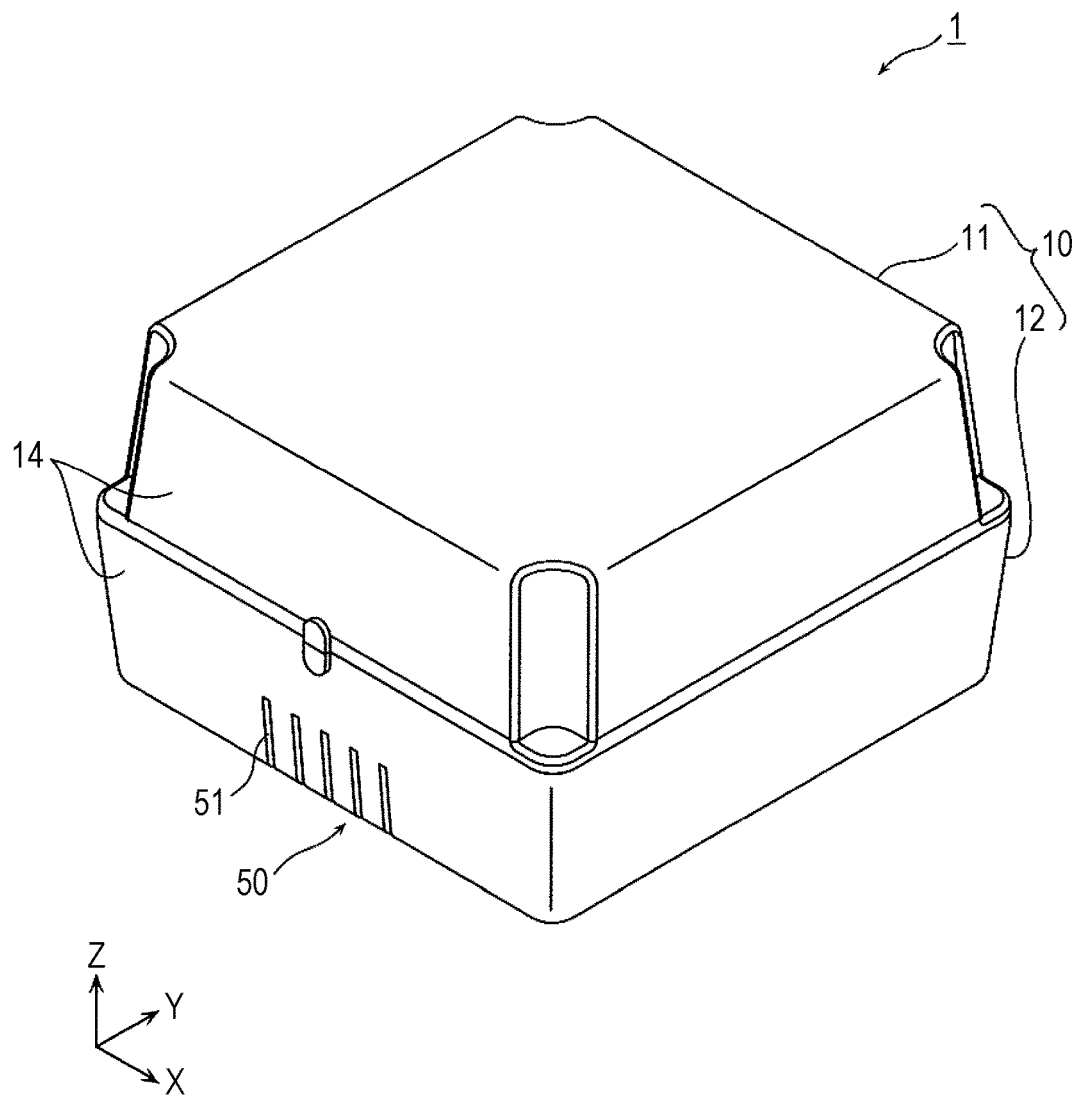
FIG. 1 is a perspective view showing an external appearance of an energy storage apparatus according to an embodiment.

According to an aspect of the present invention, there is provided an energy storage apparatus which includes: an energy storage device; an outer case which accommodates the energy storage device; a partition plate which is disposed between the energy storage device and a side wall of the outer case; and a discharge portion which is disposed on the outer case, the discharge portion having one or more openings through which a gas, which has passed through a flow passage formed between the partition plate and the side wall, is discharged from the outer case.

With such a configuration, by imparting a function of guiding a gas to the partition plate disposed between the energy storage device and the side wall of the outer case, the number of parts can be decreased. Although not limited thereto, the partition plate is typically provided for restricting the positions of the energy storage devices in a direction that a plurality of energy storage devices are arranged in a row. The partition plate is a part having a wide front surface area and hence, the partition plate is suitable for guiding a gas. The gas flows along the side wall of the outer case until the gas reaches the discharge portion while being guided by the partition plate. Accordingly, the discharge portion can be disposed at a position where a foreign substance minimally enters. Further, the partition plate is disposed between the discharge portion formed on the side wall of the outer case and the energy storage device and hence, even when a foreign substance such as rainwater enters the inside of the outer case, it is possible to block the movement of the foreign substance toward the energy storage device by the partition plate. The gas is smoothly guided to the discharge portion through the flow passage, and is discharged to the outside. Accordingly, it is possible to provide an energy storage apparatus which can enhance safety with the simple configuration.

At least a portion of the discharge portion may be disposed on a lower portion of the side wall.

With such a configuration, the discharge portion is disposed on the lower part of the side wall and hence, the flow of a foreign substance into the space where the energy storage device is disposed from the discharge portion can be suppressed. Even when a gas is discharged from the discharge portion in a state where a person holds the energy storage apparatus, the person minimally receives the gas on his face.

At least a portion of the discharge portion may be disposed on a lower wall of the outer case.

With such a configuration, at least a portion of a gas discharged from the discharge portion can be discharged toward a lower portion of the outer case. Accordingly, even when a gas is discharged in a state where a person holds the energy storage apparatus, a possibility that the person receives the gas on his face is further reduced.

A first guide portion which is disposed adjacently to the discharge portion may be further provided such that the first guide portion extends in a first direction which intersects with the partition plate and the side wall between the partition plate and the side wall.

With such a configuration, a gas which reaches between the partition plate and the side wall is guided to the discharge portion by the first guide portion. That is, the gas is efficiently discharged to the outside of the outer case by the first guide portion. Further, an effect which is caused by heat of a gas or the like and is exerted on other elements in the inside of the outer case can be suppressed.

The outer case may include: a body having an opening; and a lid body disposed so as to close the opening, the first guide portion may be disposed in the body, and the lid body may include a second guide portion which is continuously formed with the first guide portion in a second direction which intersects with the first direction.

With such a configuration, a gas is guided by the second guide portion and the first guide portion from one end portion (upper portion) to the discharge portion in the second direction of the outer case (typically the vertical direction) and hence, the gas can be discharged to the outside of the outer case more efficiently.

The outer case may further include a third guide portion which is formed on an upper wall of the outer case in a projecting manner toward the energy storage device, and guides the gas discharged from the energy storage device toward the first guide portion.

With such a configuration, for example, a gas which has discharged from a discharge valve of the energy storage device and flown toward an upper wall of the outer case (lid body) is guided by the third guide portion, and reaches the first guide portion or the second guide portion. That is, the gas is efficiently collected into a flow passage, and is discharged to the outside of the outer case from the discharge portion. Accordingly, the gas can be discharged to the outside of the outer case with more certainty.

A plurality of the energy storage devices may be accommodated in the outer case, and the discharge portion may be positioned in a direction that the plurality of energy storage devices are arranged in a row as viewed from the energy storage devices.

With such a configuration, for example, the discharge portion having one or more openings can be disposed on a straight line which passes through the discharge valves of the plurality of energy storage devices. As a result, a discharge efficiency of a gas generated in the outer case from the outer case can be enhanced. Further, the discharge portion can be formed in a mode where electrode terminals of each of energy storage devices do not disrupt the flow of a gas from the respective energy storage devices.

At least a portion of the discharge portion may be disposed on the side wall which forms a back surface of the outer case.

The energy storage apparatus is, in general, placed in a posture where a front surface of the outer case, in which parts such as LEDs for checking operations are disposed, faces a space where a person works. With such a configuration, even when a person faces the energy storage apparatus at a point of time that a gas is discharged from the discharge portion, the gas is discharged in a direction opposite to the direction toward the person. Accordingly, even when the gas is discharged from the outer case, a possibility that the gas is directed to the person can be reduced.

According to another aspect of the present invention, there is provided an energy storage apparatus which includes: an energy storage device; an outer case which accommodates the energy storage device; and a discharge portion disposed on the outer case, the discharge portion having one or more openings through which a gas, which has passed through a flow passage formed by ribs disposed on a lid body that the outer case includes, is discharged from the outer case.

With such a configuration, the flow passage for a gas is formed by the ribs disposed on the lid body of the outer case. Accordingly, a gas can be efficiently discharged to the outside of the outer case. That is, it is possible to realize the energy storage apparatus which can enhance safety with the simple configuration.

According to the aspects of the present invention, it is possible to provide an energy storage apparatus which can enhance safety with the simple configuration.

Hereinafter, an energy storage apparatus according to an embodiment of the present invention is described with reference to drawings. The respective drawings are provided for describing the energy storage apparatus of the embodiment and the modifications of the embodiment, and the energy storage apparatus is not always described in the drawings with strict accuracy.

The embodiment and the modifications described hereinafter show one specific examples of the present invention. In the embodiment and the modifications, numerical values, shapes, materials, constitutional elements, arrangement positions and connection states of the constitutional elements, assembling methods, assembling order and the like are merely examples, and these are not intended to be used for limiting the present invention. Further, out of the constitutional elements in the embodiment and the modifications, the constitutional elements which are not described in independent claims describing the uppermost concept are described as arbitrary constitutional elements.

Embodiment

A schematic configuration of an energy storage apparatus 1 according to the embodiment is described with reference to FIG. 1 to FIG. 3.

FIG. 1 is a perspective view showing an external appearance of the energy storage apparatus 1. FIG. 2 is an exploded perspective view of the energy storage apparatus 1. FIG. 3 is a perspective view showing the structure of a body 12 of an outer case 10.

In these drawings, a Z axis direction is indicated as a vertical direction, and the description will be made hereinafter assuming the Z axis direction as the vertical direction. In an actual use state, there may be a case where the Z axis direction does not agree with the vertical direction. In FIG. 3, for clearly showing the internal structure of the body 12, the body 12 is illustrated in a state where a portion of the body 12 on a plus side in the X axis direction is cut out.

The energy storage apparatus 1 is an apparatus which includes one or more energy storage devices and is capable of charging electricity thereinto from the outside and is capable of discharging electricity to the outside. For example, the energy storage apparatus 1 is a battery module used in electricity storage use and power source use. The energy storage apparatus 1 according to this embodiment is preferably used as a stationary power source apparatus.

The energy storage apparatus 1 includes: energy storage devices 100; and an outer case 10 which accommodates the energy storage devices 100 therein. In this embodiment, as shown in FIG. 2, three energy storage devices 100 are accommodated in the outer case 10. In the outer case 10, other elements such as a control board for monitoring and controlling states of the respective energy storage devices 100, and external terminals for charging electricity and for discharging electricity (a positive external terminal and a negative external terminal) may be disposed. Illustrations and descriptions of these other elements are omitted.

The outer case 10 is a container (module case) having a rectangular shape (box shape). The outer case 10 holds objects to be accommodated such as a plurality of energy storage devices 100 at predetermined positions, and protects these components from an impact or the like. A material for forming the outer case 10 is not particularly limited. For example, the outer case 10 is made of an insulating resin such as polycarbonate, polypropylene (PP) or the like.

By forming the outer case 10 using a resin, the energy storage apparatus 1 can be light-weighted thus facilitating installation and maintenance of the energy storage apparatus 1. Further, compared to a case where the outer case is made of metal, a manufacturing cost of the energy storage apparatus 1 can be lowered.

The outer case 10 includes: the body 12 having a lower wall 15 (see FIG. 3); and a lid body 11 (see FIG. 2) disposed so as to close an opening of the body 12. The body 12 and the lid body 11 are fixed to each other using fastening members such as bolts and nuts (not shown in the drawing), for example. Alternatively, the body 12 and the lid body 11 may be connected to each other by joining a peripheral edge (a peripheral edge flange) of the opening of the body 12 and a peripheral edge of the lid body 11 to each other by thermal welding.

The energy storage apparatus 1 further includes partition plates 40*a* to 40*d*. The partition plates 40*a* to 40*d* are connected to the lower wall 15 of the outer case 10. These four partition plates 40*a* to 40*d* regulate positions of three energy storage devices 100 in a direction that three energy storage devices 100 are arranged in a row (Y axis direction).

In this embodiment, the plurality of partition plates 40*a* to 40*d* are disposed substantially parallel to each other at substantially fixed intervals, and extend substantially perpendicular to the lower wall 15.

The plurality of partition plates 40*a* to 40*d* may be formed integrally with the lower wall 15 using a resin.

Out of the partition plates 40*a* to 40*d*, the partition plate 40*a* which is disposed closest to one side wall 14 of the outer case 10 forms a gas flow passage (exhaust passage) 21*a* through which the gas flows when a gas is discharged from any one of three energy storage devices 100. The partition plate 40*a* is disposed between the energy storage device 100 and the side wall 14 of the outer case 10, and is connected to the lower wall 15 of the outer case 10. On the side wall 14 which faces the partition plate 40*a* in an opposed manner, at least a portion of a discharge portion 50 having one or more openings 51 through which a gas discharged from the energy storage devices 100 is discharged to the outside of the outer case 10 is disposed. In this embodiment, five openings 51 are formed in the discharge portion 50. The structure for discharging a gas generated in the outer case 10 to the outside is described in detail later with reference to FIG. 4 to FIG. 7.

The lower wall 15 of the outer case 10 may be a wall portion on which the energy storage devices 100 are mounted. In this embodiment, out of six wall portions which constitute the outer case 10 having an approximately rectangular parallelepiped outer shape as a whole, the lower wall 15 is a wall portion on which the energy storage devices 100 are mounted. The lower wall 15 is a wall portion positioned on a side opposite to discharge valves 170 of the energy storage devices 100. An upper wall 16 of the outer case 10 (described later with reference to FIG. 6 and FIG. 7) is a wall portion which is disposed opposite to the lower wall 15 and, in general, is a wall portion which is positioned on an upper side of the energy storage apparatus 1 at the time of using the energy storage apparatus 1. In the case where the outer case 10 is formed of the body 12 and the lid body 11, the upper wall 16 of the outer case 10 is a wall portion of the lid body 11.

Side walls of the outer case 10 are wall portions which connect the lower wall 15 and the upper wall 16 to each other. In this embodiment, the outer case 10 includes four side walls. The discharge portion 50 is disposed on the side wall 14 which forms a back surface of the outer case 10 (a side wall facing a long-side surface of the energy storage device 100 in an opposed manner) out of these four side walls. A surface of the outer case 10 on a depth side in FIG. 1 (on a plus side in the Y axis direction) is a front surface of the outer case 10, and the front surface is formed of a side wall 17. In this embodiment, each of four side walls which the outer case 10 includes is formed of a portion of the body 12 and a portion of the lid body 11 as shown in FIG. 1 and FIG. 2.

Figure 2:
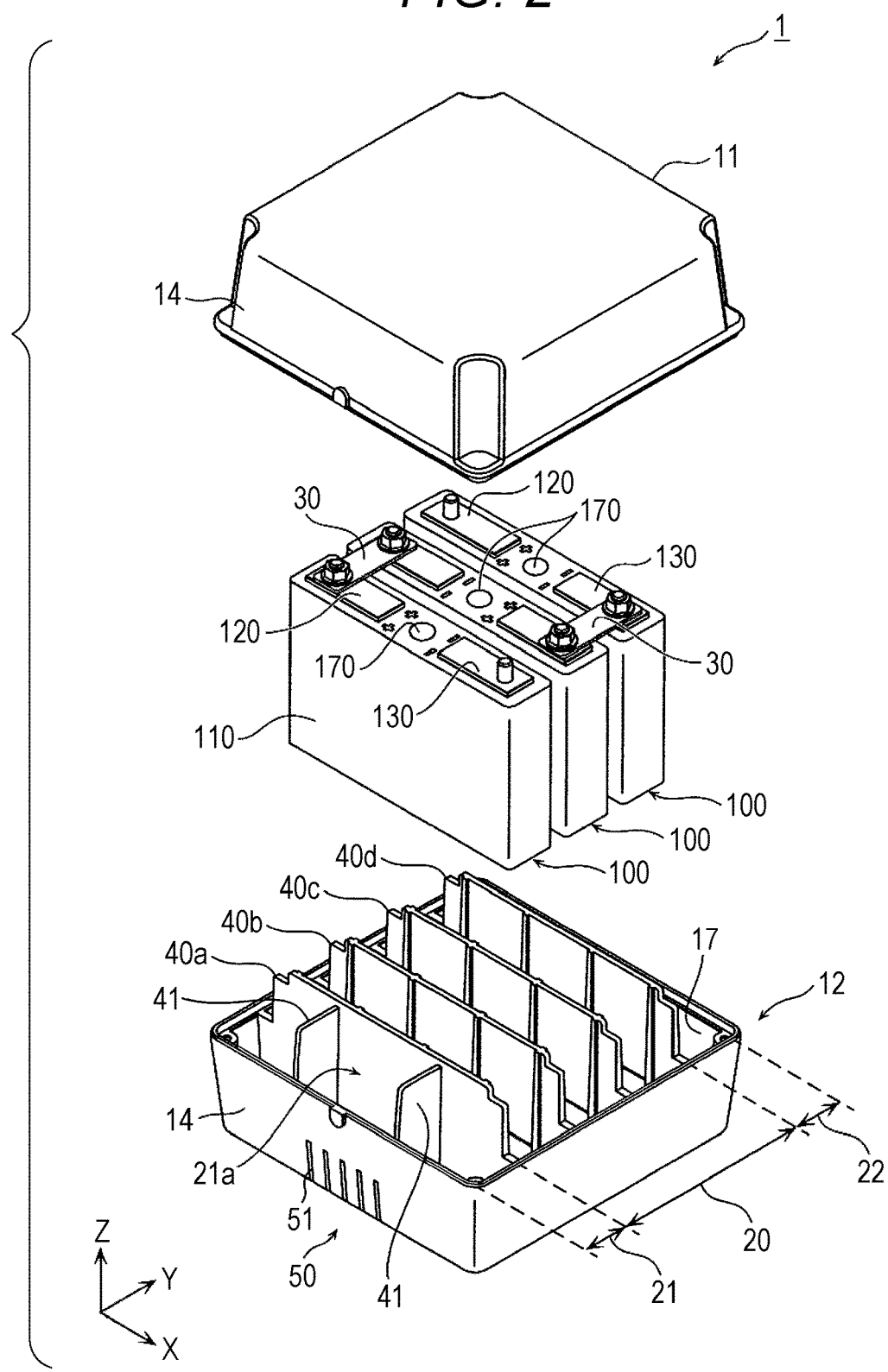
FIG. 2 is an exploded perspective view of the energy storage apparatus.

As shown in FIG. 2, three energy storage devices 100 which the energy storage apparatus 1 includes are connected to each other in series by two bus bars 30. The number of energy storage devices 100 which the energy storage apparatus 1 includes is not limited to three, and may be set to two or less, or four or more. By making the size of the outer case 10 larger than the size of the outer case 10 shown in FIG. 2 and the like, four or more energy storage devices 100 may be accommodated in the outer case 10 corresponding to the size of the outer case 10. A connection mode of the plurality of energy storage devices 100 is not particularly limited, and may be any one of the series connection, the parallel connection, and the combination of the series connection and the parallel connection.

The energy storage device 100 is a secondary battery (cell) which can charge electricity or discharge electricity. To be more specific, the energy storage device 100 is a nonaqueous electrolyte secondary battery such as a lithium ion secondary battery.

The energy storage device 100 includes a flat (angular) metal-made container 110, and a positive electrode terminal 120 and a negative electrode terminal 130 disposed in the container 110. The energy storage device 100 is not limited to a nonaqueous electrolyte secondary battery, and may be a secondary battery other than the nonaqueous electrolyte secondary battery or may be a capacitor. The container 110 is not limited to the rectangular metal-made container. The plurality of energy storage devices 100 may have different-type containers respectively.

In this embodiment, the plurality of energy storage devices 100 each having a rectangular (prismatic) metal-made container are arranged in a row in one direction (Y axis direction) in a state where long-side surfaces of the energy storage devices 100 opposedly face each other. The partition plates 40b, 40c are disposed between the long-side surfaces of the energy storage devices 100 disposed adjacently to each other.

In the energy storage device 100, an electrode assembly, a positive electrode current collector which connects the electrode assembly and a positive electrode terminal 120 to each other, and a negative electrode current collector which connects the electrode assembly and a negative electrode terminal 130 to each other are disposed in the container 110. A liquid such as an electrolyte solution is sealed in the container 110.

The discharge valve 170 is mounted on a surface of the container 110 on which the electrode terminals (120, 130) are disposed. To be more specific, the discharge valve 170 is positioned between the positive electrode terminal 120 and the negative electrode terminal 130 (approximately the center between the positive electrode terminal 120 and the negative electrode terminal 130) in a direction along which the positive electrode terminal 120 and the negative electrode terminal 130 are disposed (X axis direction). As shown in FIG. 2, for example, the plurality of energy storage devices 100 are disposed such that the respective discharge valves 170 are disposed in a direction along which the plurality of energy storage devices 100 are arranged in a row (Y axis direction).

The discharge valve 170 opens when an internal pressure of the container 110 is increased, and is provided to each energy storage device 100 as a safety mechanism for discharging a gas in the container 110. The present invention is not limited to a configuration where all of the plurality of energy storage devices 100 which the energy storage apparatus 1 includes are provided with the discharge valve 170, and it is sufficient that at least one energy storage device 100 includes the discharge valve 170.

The electrode assembly which the energy storage device 100 includes is a winding-type electrode assembly formed by winding a positive electrode, a negative electrode, and a separator which are disposed in a layered manner such that the separator is sandwiched between the positive electrode and the negative electrode, for example. The electrode assembly is not limited to a winding type electrode assembly and may be, for example, a stacked-type electrode assembly where a flat-plate-like positive electrode and a flat-plate-like negative electrode are alternately stacked to each other with a separator interposed therebetween.

The positive electrode is an electrode plate formed by forming a positive active material layer on a surface of an elongated strip-shaped conductive positive current collecting foil made of aluminum, an aluminum alloy or the like. The negative electrode is an electrode plate formed by forming a negative active material layer on a surface of an elongated strip-shaped conductive negative current collecting foil made of copper, a copper alloy or the like. The separator is a microporous sheet.

As materials used for forming the positive electrode, the negative electrode and the separator which are parts of the energy storage device 100, known materials can be suitably used provided that performance of the energy storage device 100 is not impaired. Also with respect to an electrolyte solution (nonaqueous electrolyte) sealed in the container 110, a kind of the electrolyte solution is not particularly limited and various kinds of electrolyte solution can be selected provided that performance of the energy storage device 100 is not impaired.

The positive electrode terminal 120 and the negative electrode terminal 130 are metal-made electrode terminals for discharging electricity stored in the electrode assembly accommodated in the container 110 to a space outside the energy storage device 100 and for introducing electricity into a space inside the energy storage device 100 for storing electricity in the electrode assembly.

In this embodiment, on the respective positive electrode terminal 120 and the negative electrode terminal 130, a bolt for connecting the positive electrode terminal 120 and the negative electrode terminal 130 to a conductive member such as the bus bar 30 is disposed, and the positive electrode terminal 120 or the negative electrode terminal 130 and the conductive member such as the bus bar 30 are fastened to each other using the bolt and a nut (not shown in the drawing). Alternatively, a welding terminal to which the conductive member such as the bus bar 30 is joined by welding may be selected as the positive electrode terminal 120 and the negative electrode terminal 130.

In this embodiment, each energy storage device 100 is disposed between two partition plates. To be more specific, the energy storage device 100 is disposed between the partition plates 40a, 40b, between the partition plates 40b, 40c, and between the partition plates 40c, 40d respectively. With such a configuration, three energy storage devices 100 are regulated at predetermined positions in the Y axis direction in the outer case 10 respectively.

The partition plates 40a and 40d according to this embodiment also play a role of partitioning a space in the outer case 10. As shown in FIG. 2, between the partition plate 40a and the partition plate 40d, a space for arranging three energy storage devices 100 (energy storage device arranging space 20) is formed. A space (flow passage space) 21 which includes the gas flow passage is formed between the partition plate 40a and the side wall 14 to which the discharge portion 50 is provided. A space (equipment arranging space 22) in which electric equipment (not shown in the drawing) such as the control board is disposed is formed between the partition plate 40d and the side wall 17 which forms the front surface of the outer case 10.

In this embodiment, two opposedly-facing side walls 14, 17 of the outer case 10 define the flow passage space 21 and the equipment arranging space 22 in cooperation with the partition plates 40a, 40d disposed adjacent to the side walls 14, 17 respectively. The flow passage space 21 and the equipment arranging space 22 are positioned on sides opposite to each other in a direction along which the plurality of energy storage devices 100 are arranged in the outer case 10.

The partition plate 40a has a first surface which directly faces the energy storage device 100 in an opposed manner, and a second surface which directly faces the flow passage 21a in an opposed manner.

A height (a size in the Z axis direction) of the partition plate 40a is substantially equal to a height of the energy storage device 100 or is slightly lower than the height of the energy storage device 100.

It is preferable that a width (a size in the X axis direction) of the partition plate 40a be set slightly larger than a width of the energy storage device 100.

The partition plate 40d blocks the inflow of a gas discharged from the discharge valve 170 of the energy storage device 100 into the equipment arranging space 22.

The partition plate 40d has a first surface which directly faces the energy storage device 100 in an opposed manner, and a second surface which directly faces the equipment arranging space 22 in an opposed manner.

It is preferable that a width (a size in the X axis direction) of the partition plate 40d be set slightly larger than a width of the energy storage device 100.

The partition plates 40a, 40d are higher than four side walls of the body 12 of the outer case 10. In other words, the partition plates 40a, 40d project upward from end portions (upper ends) of four side walls of the body 12. With such partition plates 40a, 40d, guiding and blocking of a gas discharged from the discharge valve 170 of the energy storage device 100 can be performed with certainty.

The energy storage apparatus 1 includes first guide portions 41 which extend in a vertical direction between the partition plate 40a and the side wall 14. To be more specific, a pair of first guide portions 41 is disposed between the partition plate 40a and the side wall 14 so as to further separate the flow passage space 21 between the partition plate 40a and the side wall 14, and the flow passage 21a is formed between the pair of first guide portions 41.

The pair of first guide portions 41 extends in a direction (Y axis direction) which intersects with the partition plate 40a and the side wall 14. A side edge of the partition plate 40a on one side is brought into contact with the second surface of the partition plate 40a, and a side edge of the partition plate 40a on the other side is brought into contact with an inner surface of the side wall 14. Thus, the rigidity of the outer case 10 is enhanced by the guide portions 41.

The energy storage apparatus 1 has the structure for discharging a gas discharged from the discharge valves 170 of the energy storage devices 100 when the discharge valves 170 are opened to the outside of the outer case 10. This structure is specifically described in detail with reference to FIG. 4 to FIG. 7.

Figure 4:
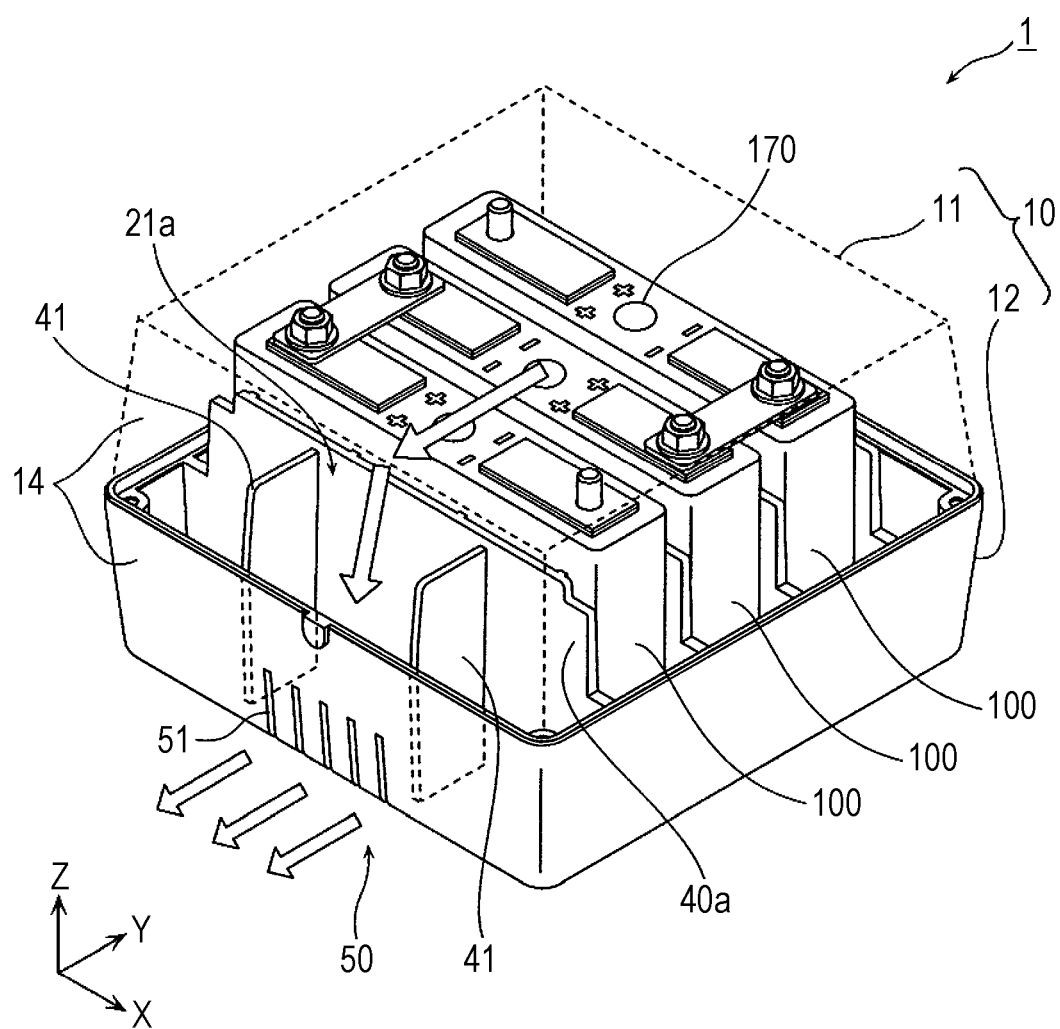
FIG. 4 is a view schematically showing the flow of a gas in the energy storage apparatus.

FIG. 4 is a view schematically showing the flow of a gas in the energy storage apparatus 1. In FIG. 4, for illustrating the flow of a gas in the outer case 10, a simplified outer shape of the lid body 11 is illustrated by a dotted line.

Figure 3:
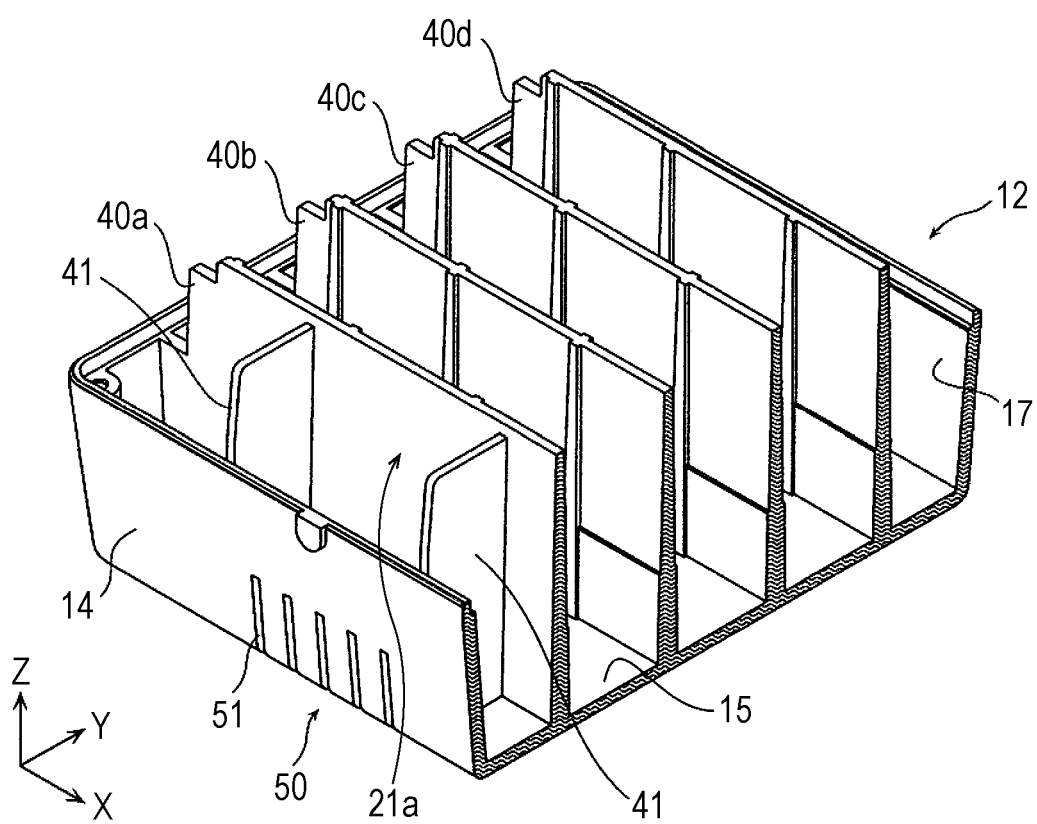
FIG. 3 is a perspective view showing the structure of a body of an outer case.

As shown in FIG. 4, in the energy storage apparatus 1, the partition plate 40a is disposed between the energy storage device 100 and the side wall 14, and the partition plate 40a is connected to the lower wall 15 (see FIG. 3). The discharge portion 50 is formed on the outer case 10. The discharge portion 50 has one or more openings 51 through which a gas which has passed through the flow passage 21a formed between the partition plate 40a and the side wall 14 is discharged to the outside of the outer case 10.

The structure is described more specifically. Assume that the energy storage apparatus 1 is installed and used in a state shown in FIG. 4. The discharge valves 170 of the plurality of energy storage devices 100 are directed upward respectively. The plurality of discharge valves 170 are positioned at substantially the same height, and are arranged on a straight line (on the Y axis). When a gas is discharged from the discharge valve 170, the gas is guided toward the partition plate 40a and the first guide portions 41 by terminal surfaces (a surface on which the electrode terminals 120, 130 are formed) of the energy storage devices 100, and the upper wall 16 and third guide portions 43 of the outer case 10 shown in FIG. 6. When the gas reaches an inner surface of a corner portion of the lid body 11, the gas flows downward through the flow passage 21a formed between the partition plate 40a and the side wall 14. When the gas reaches the discharge portion 50 positioned on a downstream side of the flow passage 21a, the gas is discharged to the outside of the outer case through the openings 51.

As described above, the energy storage apparatus 1 according to this embodiment is preferably used as a stationary power source apparatus. With respect to space efficiency, a demand for space efficiency required for the stationary power source apparatus is not so high compared to a demand for space efficiency required for a vehicle-use power source. On the other hand, the stationary power source apparatus is requested to satisfy a condition that the installation and the maintenance of the energy storage apparatus is easy or a condition that power source apparatus can withstand the various use environments. Therefore, in the energy storage apparatus 1 according to this embodiment, the flow passage 21a for guiding a gas downward is formed using the partition plate 40a in the outer case 10, and the discharge portion 50 is formed on a downstream side of the flow passage 21a. The partition plate 40a is a part having a large surface area and hence, the partition plate 40a is suitable for guiding a gas. Further, the partition plate 40a is suitable also for blocking the intrusion of a foreign substance.

The energy storage apparatus 1 has the above-mentioned structure and hence, a gas discharged from the discharge valve 170 of the energy storage device 100 can be guided to the outside of the outer case 10 through the discharge portion 50. As a result, it is possible to suppress the increase of an internal pressure of the outer case 10 in the case where the discharge valve 170 is opened. The partition plate 40a which forms the flow passage 21a in cooperation with the side wall 14 is connected to the lower wall 15 of the outer case 10. In this embodiment, the partition plate 40a is integrally formed with the body 12. Accordingly, even when a foreign substance such as water flows into the flow passage 21a through the discharge portion 50, it is possible to prevent the foreign substance from reaching the energy storage device 100 due to the presence of the partition plate 40a. The partition plate 40a also has a function of regulating the position of the energy storage device 100. In other words, the partition plate 40a which regulates the position of the energy storage device 100 also performs a function of partitioning the energy storage device arranging space 20 and the flow passage 21a from each other. By allowing one member (portion) to perform a plurality of functions, the structure of the energy storage device 100 can be simplified.

As described above, the energy storage apparatus 1 can enhance safety with the simple configuration.

In this embodiment, at least a portion of the discharge portion 50 is disposed on a lower portion of the side wall 14. For example, assuming that a height (a width in the Z axis direction) of the side wall 14 is equally divided in three, the discharge portion 50 is disposed on a portion of the side wall 14 positioned at the lowermost position.

In this manner, the discharge portion 50 is disposed at the position in the vicinity of the lower wall 15 in the vertical direction and hence, even when a foreign substance flows into the outer case 10 through the discharge portion 50, it is difficult for the foreign substance to get over the partition plate 40a connected to the lower wall 15. That is, an effect of suppressing inflow of a foreign substance into the energy storage device arranging space 20 from the discharge portion 50 can be increased. Even when a gas is discharged from the discharge portion 50 in a state where a person holds the energy storage apparatus 1, the person minimally receives the gas on his face.

Figure 5:
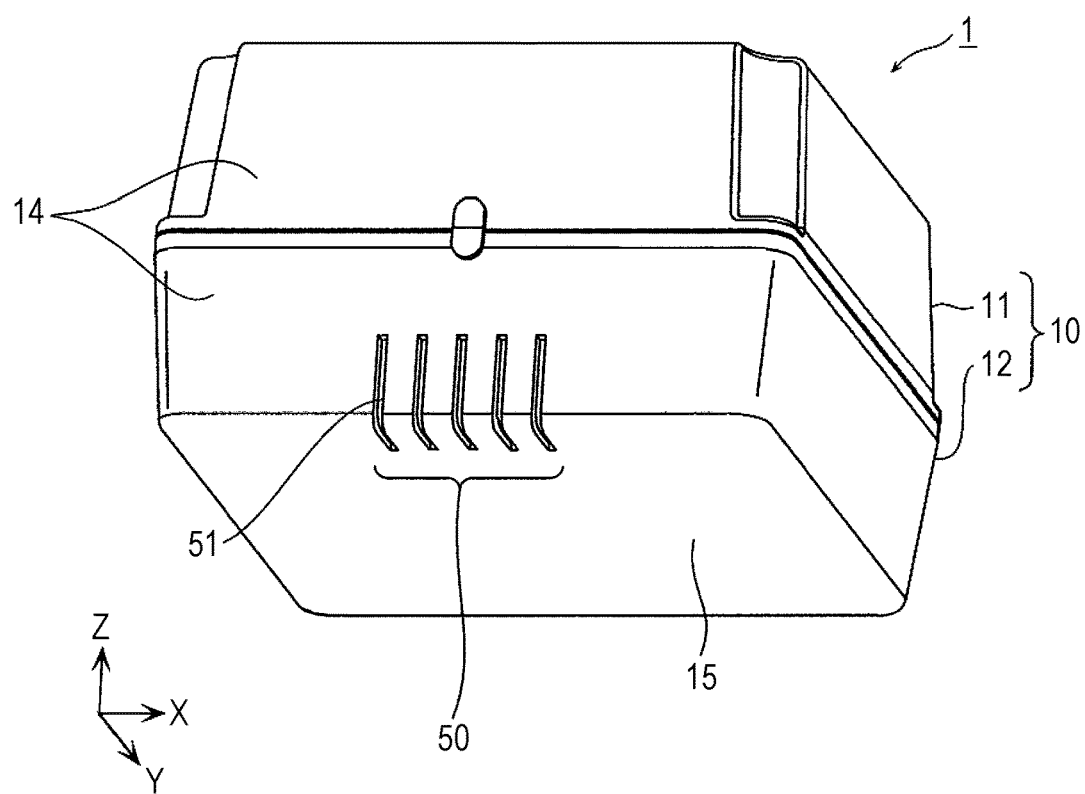
FIG. 5 is a perspective view showing a configuration of a discharge portion.

To be more specific, the discharge portion 50 is configured as shown in FIG. 5. As shown in FIG. 5, at least a portion of the discharge portion 50 is disposed on the lower wall 15. The discharge portion 50 is disposed in a straddling manner over the side wall 14 and the lower wall 15. That is, a portion of the discharge portion 50 is disposed on the side wall 14, and a remaining portion of the discharge portion 50 is disposed on the lower wall 15.

With such a configuration, at least a part of a gas discharged to the outside of the outer case 10 from the discharge portion 50 can be discharged downward (a minus side in the Z axis direction) from the outer case 10 (energy storage apparatus 1). Accordingly, in a case where a gas is generated in a state where a person holds the energy storage apparatus 1, a possibility that the person receives the gas on his face can be further reduced. By disposing the whole discharge portion 50 on the lower wall 15, it is also possible to discharge almost all gas to be discharged to the outside of the outer case 10 downward from the outer case 10.

The energy storage apparatus 1 includes the first guide portions 41 which extend in a vertical direction (Z axis direction) between the partition plate 40a and the side wall 14 and form surfaces extending along a direction (Y axis direction) which intersects with the partition plate 40a and the side wall 14. The first guide portions 41 are disposed on both sides of the discharge portion 50 as shown in FIG. 4.

With the above-mentioned structure, a gas which is discharged from the discharge valve 170 of the energy storage device 100 and reaches between the partition plate 40a and the side wall 14 is guided to the discharge portion 50 by the first guide portions 41. That is, the flow passage space 21 is regulated in a more limited manner by the first guide portions 41 and, as a result, a gas discharged from the energy storage device 100 is efficiently discharged from the discharge portion 50.

Also in the case where first guide portions 41 are not provided, the flow passage 21a is formed by the partition plate 40a and the side wall 14. However, by regulating a space region in a lateral direction (X axis direction) of the flow passage space 21 by the first guide portions 41, a length of the flow passage for a gas can be shortened and, as a result, a gas discharging efficiency at the discharge portion 50 is enhanced. Further, it is possible to suppress the influence which heat or the like of a gas discharged from the energy storage devices 100 exerts on other elements in the outer case 10.

In this embodiment, the pair of first guide portions 41 is provided between the partition plate 40a and the side wall 14 so as to regulate the flow passage 21a from both sides in the lateral direction. By arranging at least one first guide portion 41 on the side of the discharge portion 50, gas discharging efficiency at the discharge portion 50 can be enhanced. The pair of first guide portions 41 in this embodiment is integrally formed with the resin-made body 12 in the same manner as the partition plate 40a. However, the pair of first guide portions 41 may be provided to the outer case 10 as separate members from the body 12.

The energy storage apparatus 1 of this embodiment further includes constitutional elements for efficiently guiding a gas to the outside of the outer case 10. To be more specific, as shown in FIG. 6 and FIG. 7, second guide portions 42 and third guide portions 43 are formed on the lid body 11 which is an integral portion of the outer case 10.

Figure 6:
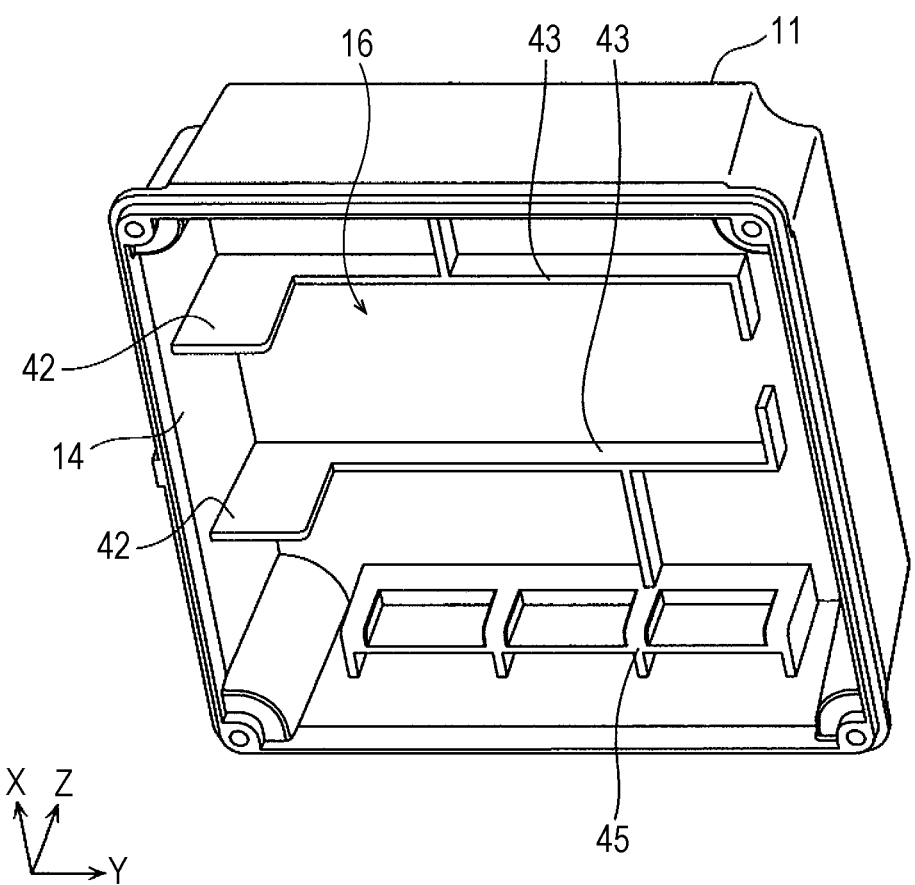
FIG. 6 is a perspective view showing the structure of a lid body.

FIG. 6 is a perspective view showing the structure of the lid body 11 according to the embodiment. FIG. 7 is a view showing the flow of a gas in the energy storage apparatus 1 according to the embodiment in detail. In FIG. 7, to clearly illustrate the flow of a gas in the outer case 10, with respect to the lid body 11 and the energy storage devices 100, profiles of these constitutional elements are illustrated in a simplified manner by a dotted line. Further, with respect to the plurality of partition plates (40a to 40d), only the partition plate 40a which forms the gas flow passage 21a is illustrated in a simplified manner, and the illustration of other partition plates (40b to 40d) is omitted.

As shown in FIG. 6, the lid body 11 includes the second guide portions 42 (in this embodiment, a pair of second guide portions). As shown in FIG. 7, the second guide portions 42 are formed continuously with the first guide portions 41 in a vertical direction (Z axis direction). Accordingly, a gas discharged from the energy storage devices 100 is guided by the second guide portions 42 and the first guide portions 41 until the gas reaches the discharge portion 50 from an upper portion of the outer case 10 in a vertical direction (Z axis direction) of the outer case 10. With such an operation, for example, a gas can be discharged to the outside of the outer case 10 more efficiently.

Figure 7:
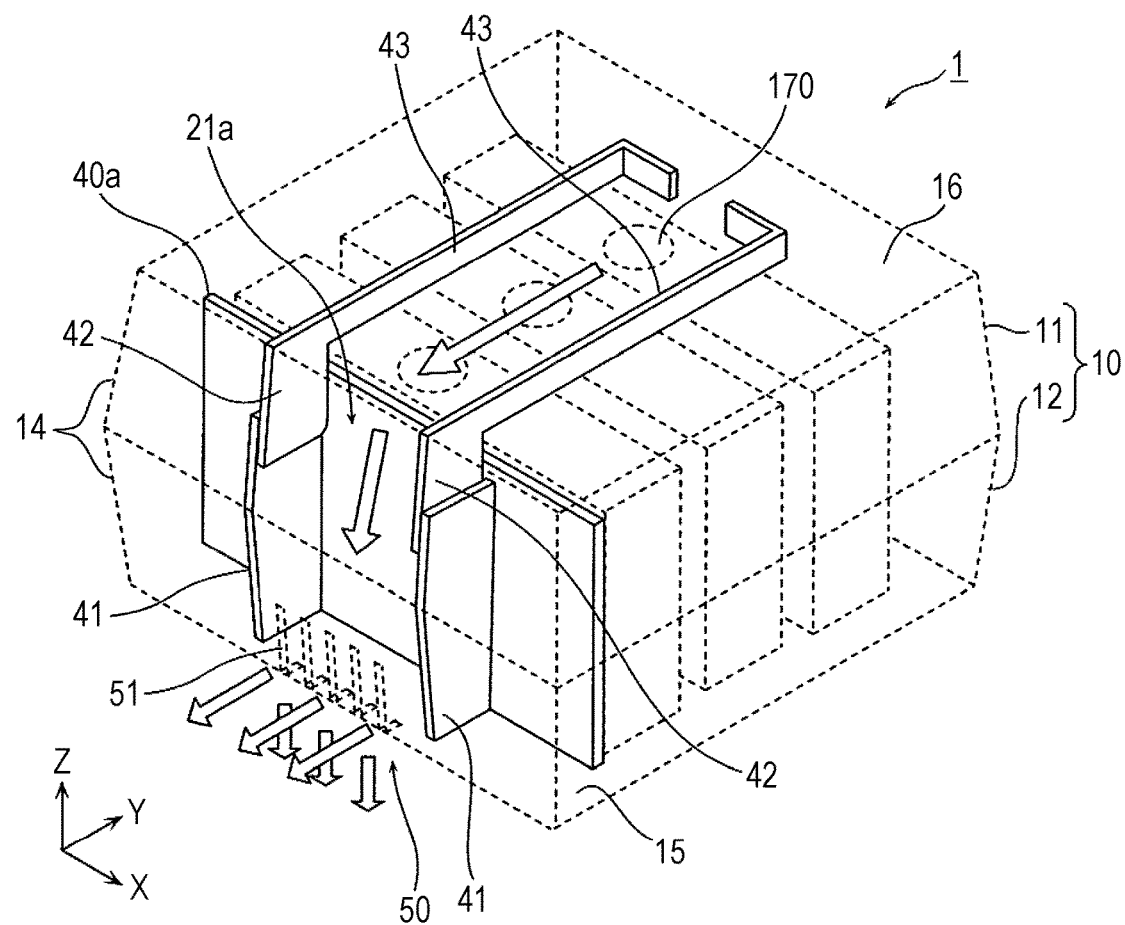
FIG. 7 is a view showing the flow of a gas in the energy storage apparatus in detail.

In this embodiment, as shown in FIG. 7, upper end portions of the first guide portions 41 and lower end portions of the second guide portions 42 are made to overlap with each other in a lateral direction (X axis direction) and hence, the second guide portions 42 are disposed continuously with the first guide portions 41 in the vertical direction. With such a configuration, it is possible to suppress that a gas which passes through the flow passage 21a leaks to the outside of the flow passage 21a through the connection portions between the first guide portions 41 and the second guide portions 42.

At the connection portion between the first guide portion 41 and the second guide portion 42, the second guide portion 42 positioned on an upstream side of the flow of a gas is disposed on an inner side of the first guide portion 41 (on a flow passage 21a side). With such a configuration, it is possible to prevent an upper end surface of the first guide portion 41 from becoming a resistance in the flow passage.

The lid body 11 further includes third guide portions 43 (in this embodiment, a pair of third guide portions). The third guide portions 43 are formed on the lid body 11 in a projecting manner toward the energy storage devices 100 in a projecting manner from the upper wall 16 of the lid body 11 (that is, the upper wall 16 of the outer case 10), and guide a gas discharged from the energy storage devices 100 toward the second guide portions 42. The third guide portions 43 blocks the inflow of a gas discharged from the energy storage devices 100 into the equipment arranging space 22 in cooperation with the partition plate 40d. It is preferable that the tip ends (lower ends) of the third guide portions 43 are in contact with the energy storage devices (surfaces on which the terminals are provided).

Due to the above-mentioned structure, a gas which is discharged from the energy storage devices 100 and flows toward the upper wall 16 of the outer case 10 (lid body 11) is guided by the third guide portions 43, and reaches the second guide portions 42. That is, a gas discharged from the energy storage devices 100 is efficiently collected to the flow passage 21a, and is discharged to the outside of the outer case 10 from the discharge portion 50. Accordingly, a gas discharged from the energy storage device 100 is discharged to the outside of the outer case 10 with more certainty.

The third guide portions 43 may guide a gas discharged from the energy storage devices 100 toward the first guide portions 41. In other words, the first guide portions 41 and the third guide portions 43 may be formed such that a gas guided by the third guide portions 43 is directly guided by the first guide portions 41. Also in this case, a gas discharged from the energy storage devices 100 is efficiently collected to the flow passage 21a, and is discharged to the outside of the outer case 10 from the discharge portion 50.

In this embodiment, the second guide portions 42 and the third guide portions 43 are formed integrally with the resin-made lid body 11 as a series of ribs formed on the upper wall 16 in a projecting manner. The third guide portions 43 are formed continuously with the second guide portions 42 in an arrangement direction of the plurality of energy storage devices 100 in a row (Y axis direction). The second guide portions 42 project more downward than the third guide portions 43 do in the Z axis direction, and distal ends of the second guide portions 42 are positioned between the partition plate 40a and the side wall 14. Each of the second guide portions 42 is configured such that one side edge at a tip end thereof is in contact with the second surface of the partition plate 40a, and another side edge is in contact with the inner surface of the side wall 14. The third guide portion 43 and the second guide portion 42 have an L shape.

As shown in FIG. 6, the lid body 11 includes regulating portions 45 which regulate the upward movement of the respective energy storage devices 100. The regulating portions 45 press three energy storage devices 100 accommodated in the body 12 from above. Due to this pressing, the positions of the respective energy storage devices 100 in the vertical direction are fixed. While the lid body 11 functions as a member for protecting one or more energy storage devices 100 as a part of the outer case 10, the lid body 11 also functions as a member for forming a gas flow passage, and also functions as a member for restricting the positions of one or more energy storage devices 100 in the inside of the outer case 10. The regulating portions 45 project more downward than the third guide portions 43 do in the Z axis direction, and distal ends of the regulating portions 45 support a terminal surfaces of the respective energy storage devices 100 (portions of the terminal surfaces in the vicinity of the short side surfaces).

The discharge portion 50 is positioned in a direction along which the the plurality of the energy storage devices 100 are arranged (Y axis direction) as viewed from the energy storage devices 100. To be more specific, as viewed in a top plan view (as viewed from a plus side in the Z axis direction), the discharge portion 50 is disposed on a straight line which passes the discharge valves 170 of three energy storage devices 100. With such a configuration, efficiency of discharging a gas generated in the outer case 10 from the outer case 10 can be enhanced. The discharge portion 50 is disposed in such a mode where the respective electrode terminals of each of three energy storage devices 100 (see FIG. 2, 120, 130) do not obstruct the flow of a gas discharged from the respective discharge valves 170. Such a configuration also contributes to the enhancement of efficiency of discharging a gas.

The side wall 14 on which the discharge portion 50 is formed is a side wall which forms a back surface of the outer case 10. A front surface of the outer case 10 is formed of an outer surface of the side wall 17 disposed on a side opposite to the side wall 14 (see FIG. 2 and FIG. 3). The front surface is a surface on which an LED for an operation confirmation, or parts such as a connector for power transmission, a connector for power reception and a connector for communication (not shown in the drawing) are disposed.

In general, the energy storage apparatus 1 is disposed in a posture where the front surface of the outer case 10 on which the above-mentioned parts such as LED are disposed faces a space where a person works. Accordingly, even when a person faces the energy storage apparatus 1 at a point of time that a gas is discharged from the discharge portion 50, the gas is discharged toward a side opposite to the direction toward the person. Therefore, according to the energy storage apparatus 1, even when a gas is discharged from the outer case 10, a possibility that the gas is directed to the person can be reduced.

When the plurality of energy storage apparatuses 1 are arranged in a row in a horizontal direction, the respective energy storage apparatuses 1 are disposed such that the front surfaces of the energy storage apparatuses 1 are directed in the same direction and hence, a gas discharged from each energy storage apparatus 1 is not directed toward neighboring energy storage apparatus 1. That is, when a gas is discharged from the discharge portion 50 of any one of the plurality of energy storage apparatuses 1, the effect that heat or the like of the gas exerts on other energy storage apparatuses 1 can be suppressed.

As described above, in the energy storage apparatus 1, the ribs formed on the lid body 11 function as the second guide portions 42 and the third guide portions 43. The energy storage apparatus 1 is expressed as follows, for example. That is, the energy storage apparatus 1 includes the energy storage devices 100, and the outer case 10 which accommodates the energy storage devices 100 therein, and the outer case 10 includes the discharge portion. The discharge portion has one or more openings through which a gas which has passed through the flow passage defined by the ribs (for example, at least the second guide portions 42 (vertical guide portions) and the third guide portions 43 (horizontal guide portions)) formed on the lid body 11 which the outer case 10 includes is discharged from the outer case 10.

According to the energy storage apparatus 1 having the above-mentioned configuration, the flow passage for a gas is formed by the ribs formed on the lid body 11. Due to such a configuration, a gas discharged from the discharge valves 170 of the energy storage devices 100 is efficiently discharged to the outside of the outer case 10. That is, the energy storage apparatus 1 which can enhance safety with the simple configuration can be realized.

The energy storage apparatus 1 may have the structure different from the above-mentioned structure as the structure for discharging a gas generated in the outer case 10 to the outside of the outer case 10 (gas discharging structure). Hereinafter, various modifications relating to the gas discharging structure are described.

Modification 1

Figure 8A:
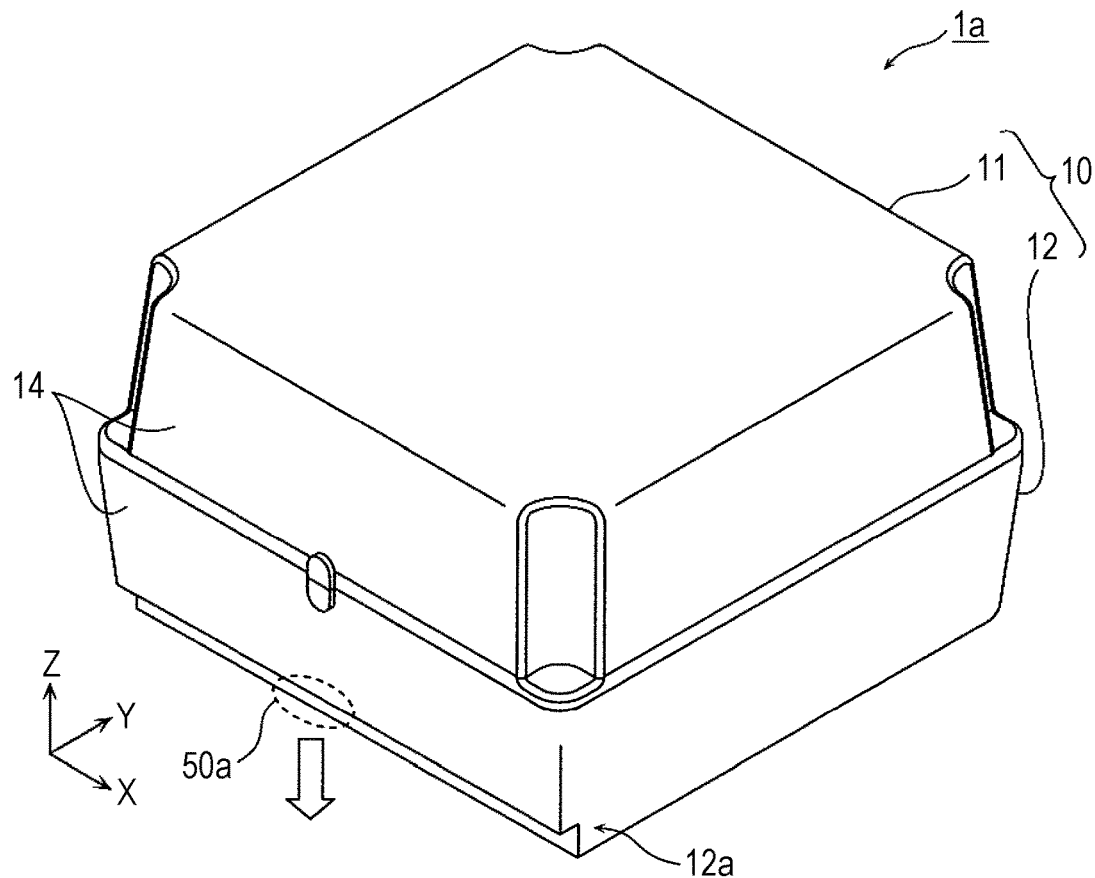
FIG. 8A is a perspective view showing an external appearance of an energy storage apparatus according to a first modification.
Figure 8B:
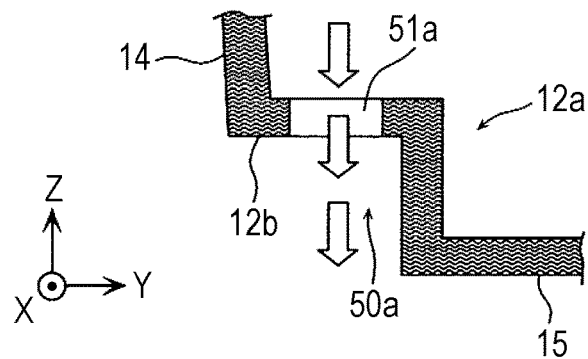
FIG. 8B is a cross-sectional view showing the technical feature of a discharge portion according to the first modification.

FIG. 8A is a perspective view showing an external appearance of an energy storage apparatus 1a according to a modification 1. FIG. 8B is a cross-sectional view showing the technical feature of a discharge portion 50a according to the modification 1. FIG. 8B shows a cross section of a portion of an outer case 10, that is, a cross section taken along a Y-Z plane which passes an opening 51a of the discharge portion 50a.

As shown in FIG. 8A and FIG. 8B, the energy storage apparatus 1a includes a stepped portion 12a on a lower portion of a front surface of the outer case 10. The stepped portion 12a is formed on a lower portion of a side wall 14 of the outer case 10. As shown in FIG. 8B, the stepped portion 12a includes a lower surface portion 12b which intersects with an outer surface of the side wall 14 of the outer case 10 (a back surface of the outer case 10), and forms a surface facing downward. One or more openings 51a which the discharge portion 50a according to this modification includes is formed in the lower surface portion 12b. With such a configuration, a possibility that a foreign substance such as water flows into the inside of the outer case 10 through the discharge portion 50a can be further reduced.

When the energy storage apparatus 1a is installed on a predetermined flat surface, the energy storage apparatus 1a is installed in a state where a lower wall 15 is brought into contact with the predetermined flat surface. Accordingly, a gap is formed between the lower surface portion 12b and the predetermined flat surface by an amount corresponding to a distance between an outer surface of the lower wall 15 (a bottom surface of the outer case 10) and the lower surface portion 12b in a vertical direction. Accordingly, it is possible to prevent the opening 51a of the discharge portion 50a disposed on the lower surface portion 12b from being closed by the predetermined flat surface on which the energy storage apparatus 1a is installed.

As described above, in the energy storage apparatus 1a, by arranging the opening 51a of the discharge portion 50a such that the opening 51a faces downward, the inflow of a foreign substance from the discharge portion 50a can be suppressed, and a gas generated in the outer case 10 can be efficiently discharged to the outside of the outer case 10. In the case where a gas is discharged from the discharge portion 50a in a state where a person holds the energy storage apparatus 1a, a possibility that the person receives the gas on his face can be further deceased.

Modification 2

Figure 9A:
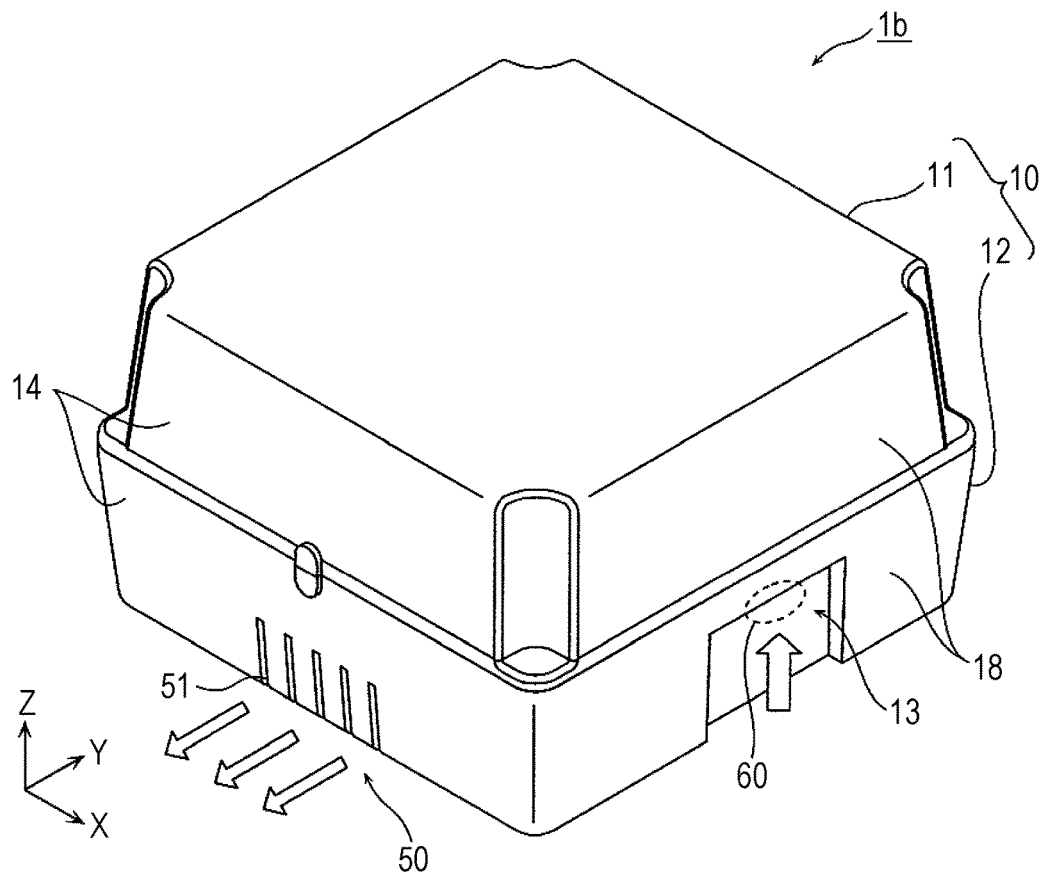
FIG. 9A is a perspective view showing an external appearance of an energy storage apparatus according to a second modification.
Figure 9B:
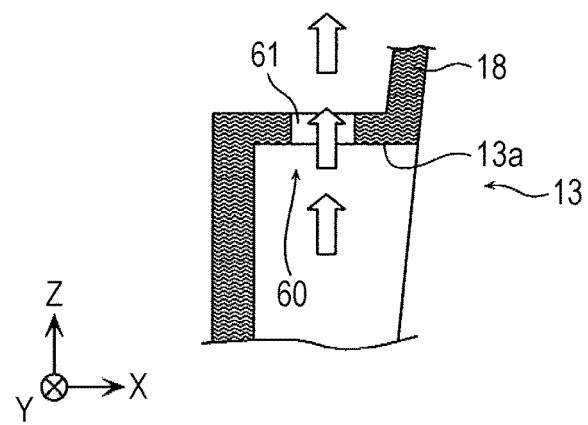
FIG. 9B is a cross-sectional view showing the technical feature of an intake part according to the second modification.

FIG. 9A is a perspective view showing an external appearance of an energy storage apparatus 1b according to a modification 2. FIG. 9B is a cross-sectional view showing the technical feature of an intake part 60 according to the modification 2. FIG. 9B shows a cross section of a portion of an outer case 10, that is, a cross section taken along a X-Z plane which passes an intake port 61 of the intake part 60.

As shown in FIG. 9A and FIG. 9B, the energy storage apparatus 1b includes grip portions 13 on side walls 18 of the outer case 10 (side walls disposed opposite to short side surfaces of an energy storage device). The grip portions 13 are portions gripped by a person when he carries the energy storage apparatus 1b, for example.

The side walls 18 is side walls forming side surfaces extending in a direction which intersects with the side wall 14 on which a discharge portion 50 is formed. Although not shown in FIG. 9A, the grip portion 13 is disposed also on a side wall of the outer case 10 on a minus side in the X axis direction and hence, when a person carries the energy storage apparatus 1b, the person can carry the energy storage apparatus 1b with his both hands using the pair of grip portions 13 formed on the outer case 10.

The grip portion 13 includes a lower surface portion 13a which intersects with an outer surface of the side wall 18 of the outer case 10, and forms a surface facing downward. One or more intake ports 61 which the intake part 60 includes are formed in the lower surface portion 13a.

When a gas is discharged from the energy storage devices 100 which the energy storage apparatus 1b includes, the gas from the energy storage devices 100 is guided to the discharge portion 50, and is discharged to the outside of the outer case 10 by the first guide portions 41, the second guide portions 42, and the third guide portions 43 shown in FIG. 7, for example. In this manner, when a gas in the outer case 10 is discharged from the discharge portion 50, since the outer case 10 includes the intake part 60, atmospheric air outside the outer case 10 flows into the inside of the outer case 10. Due to such an inflow of atmospheric air, it is possible to suppress the increase of a temperature of the energy storage device 100 where the discharge valve 170 is opened by an increase of an internal pressure. As a result, an effect of heat which the energy storage device 100 exerts on other energy storage devices 100 in the inside of the outer case 10 can be reduced.

Further, one or more intake ports 61 of the intake part 60 having the above-mentioned advantageous effect are formed such that the intake ports 61 are directed downward and hence, a possibility that a foreign substance such as water flows into the inside of the outer case 10 through the intake part 60 can be reduced. A waterproof ventilation film may be provided to the intake port 61.

Other Embodiments

The energy storage apparatus according to the present invention has been described with reference to the embodiments and the modifications heretofore. However, the present invention is not limited to the above-mentioned embodiments and modifications. The configurations acquired by applying various modifications which those who are skilled in the art have conceived to the previously-mentioned embodiments and modifications, and the configurations acquired by combining the plurality of constitutional elements described above are also included in the scope of the present invention unless otherwise the configurations depart from the gist of the present invention.

For example, although the partition plates 40a to 40d are integrally formed with the body 12 of the outer case 10 in the embodiment and the modifications, at least one of the partition plates 40a to 40d and the body 12 may be formed as separate parts from each other. For example, by forming the partition plate 40a which forms the flow passage 21a as a part separate from the outer case 10, the partition plate 40a can be formed using a raw material having higher heat resistance property than other partition plates 40b to 40d have.

For example, a member made of a raw material having high heat resistance property or high heat insulation property such as a phenol resin, ceramics, or glass wool may be disposed on a portion of the upper wall 16 (see FIG. 6) of the outer case 10 (lid body 11) on which a gas discharged from three energy storage devices 100 impinges. With such a configuration, the upper wall 16 can be protected from heat and an impact of a gas.

Although at least a portion of the discharge portion 50 is disposed on the lower portion of the side wall 14 in the embodiment and the modifications, the discharge portion 50 may be disposed at a position other than the lower portion of the side wall 14. For example, by disposing the discharge portion 50 at a position lower than a height of the partition plate 40a (a minus side in the Z axis direction) in FIG. 7, the partition plate 40a functions as a baffle plate for a foreign substance which flows into the outer case 10 from the discharge portion 50. The discharge portion 50 may be formed on a portion of the side wall 14 which is formed by the lid body 11. Further, the discharge portion 50 may be formed on the side wall 14 such that the discharge portion 50 extends between and over the lid body 11 and the body 12.

The outer case 10 may be formed of a metal-made plate. By forming the outer case 10 using metal, strength, vibration resistance and weather resistance of the energy storage apparatus 1 are enhanced.

In the embodiments, the plurality of energy storage devices 100 each having a rectangular metal-made container are arranged in a row along one direction in a state where the long side surfaces of the energy storage devices 100 face each other in an opposed manner. However, the direction that the energy storage devices 100 are arranged is not limited.

In the modification 2, the grip portion 13 is formed on the side walls 18 of the outer case which face the short side surfaces of the energy storage device in an opposed manner, and the intake part 60 is formed on the grip portion 13. Alternatively, the intake part may be formed by forming openings having substantially the same shape as the openings 51 of the discharge portion 50 in the side wall 18 of the outer case which faces the short side surface of the energy storage device in an opposed manner without providing the grip portion 13.

An energy storage apparatus may be configured such that atmospheric air which flows into the inside of the outer case from an intake part formed on the side wall 18 of the outer case which faces the short side surface of the energy storage device in an opposed manner passes through gaps formed between the plurality of energy storage devices which are arranged in a row in the inside of the outer case (gaps formed between the long side surfaces of the energy storage devices which face each other in an opposed manner).

The discharge portions 50, 50a may be positioned above the discharge valves 170 of the energy storage devices 100.

INDUSTRIAL APPLICABILITY

The present invention is applicable to an energy storage apparatus which includes a plurality of energy storage devices and the like.

What is claimed is:

1. An energy storage apparatus comprising:
a first energy storage device;
an outer case which accommodates the first energy storage device;
a partition plate which is disposed between the first energy storage device and a side wall of the outer case;
a discharge portion which is disposed on the outer case, the discharge portion having one or more openings through which a gas, which has passed through a flow passage formed between the partition plate and the side wall, is discharged from the outer case; and
a first guide portion which is disposed adjacently to the discharge portion, the first guide portion extending in a first direction, which intersects with the partition plate and the side wall, from the partition plate to the side wall, wherein the outer case includes:
a body having an opening; and
a lid body disposed so as to close the opening,
wherein the body includes a lower wall opposing to the lid body, and
wherein the first guide portion extends in a direction which intersects the lid body and the lower wall.

2. The energy storage apparatus according to claim 1, wherein at least a portion of the discharge portion is disposed on a lower portion of the side wall.

3. The energy storage apparatus according to claim 1, wherein at least a portion of the discharge portion is arranged on a lower wall of the outer case.

4. The energy storage apparatus according to claim 1, wherein the outer case includes: a body having an opening; and a lid body disposed so as to close the opening, the first guide portion is disposed in the body, and
the lid body includes a second guide portion which is continuously formed with the first guide portion in a second direction which intersects with the first direction.

5. The energy storage apparatus according to claim 1, wherein the outer case further includes a third guide portion which is formed on an upper wall of the outer case in a projecting manner toward the first energy storage device, and guides the gas discharged from the first energy storage device toward the first guide portion.

6. The energy storage apparatus according to claim 1, further comprising a second energy storage device accommodated in the outer case,
wherein the discharge portion is positioned in a direction that the first energy storage device and the second energy storage device are arranged in a row.

7. The energy storage apparatus according to claim 1, wherein the partition plate is connected to a lower wall of the outer case.

8. The energy storage apparatus according to claim 1, wherein the partition plate has a first surface which directly opposedly faces the first energy storage device and a second surface which directly opposedly faces the flow passage.

9. The energy storage apparatus according to claim 1, wherein the first energy storage device includes a discharge valve for discharging a gas, and
the discharging portion is positioned below the discharge valve.

10. The energy storage apparatus according to claim 9, wherein the outer case has two side walls which opposedly face each other, and said two side walls define a flow passage space, in which the flow passage is disposed, and an equipment arranging space, in which electric equipment is disposed, in corporation with two partition plates disposed in the outer case adjacently to said two side walls respectively.

11. The energy storage apparatus according to claim 10, wherein the partition plate which defines the equipment arranging space is configured to block the inflow of a gas discharged from the discharge valve of the first energy storage device to the equipment arranging space.

12. The energy storage apparatus according to claim 1, wherein the first guide portion is in contact with the side wall of the outer case and the partition plate.

13. The energy storage apparatus according to claim 1, wherein the first guide portion is in direct contact with the side wall of the outer case and the partition plate.

14. An energy storage apparatus comprising:
a plurality of energy storage devices arranged in a first direction in a row;

an outer case which accommodates the plurality of energy storage devices; and a discharge portion formed on the outer case, the outer case having one or more openings through which a gas, which has passed through a flow passage formed by ribs formed on a lid body that the outer case includes, is discharged from the outer case, wherein the outer case includes:
 a body having an opening; and
 the lid body disposed above the body in a second direction which intersects with the first direction, so as to close the opening of the body, wherein the body includes a lower wall opposing to the lid body, wherein at least a part of the rib is disposed closer to the lower wall than a surface of one of the plurality of energy storage devices is, the surface opposing the lid body, and wherein the at least the part of the rib has a first length in the first direction and a second length in a third direction which intersects with the first direction and the second direction, the first length being longer than the second length.

15. The energy storage apparatus according to claim 14, wherein the plurality of energy storage devices comprises a first energy storage device and a second energy storage device, the first energy storage device being disposed closer to an end portion of the lid body than the second energy storage device is, in the first direction, and the rib includes:
a horizontal guide portion which is formed on an upper wall of the lid body, projects toward the plurality of energy storage devices, and extends in the first direction; and a vertical guide portion which is formed on the upper wall and a side wall of the lid body, projects toward the first energy storage device, and is arranged on a side of the first energy storage device.

16. An energy storage apparatus comprising:
a first energy storage device;
an outer case which accommodates the first energy storage device;
a partition plate which is disposed between the first energy storage device and a side wall of the outer case;
a discharge portion which is disposed on the outer case, the discharge portion having one or more openings through which a gas, which has passed through a flow passage formed between the partition plate and the side wall, is discharged from the outer case; and
a first guide portion which is disposed adjacently to the discharge portion, the first guide portion extending in a first direction, which intersects with the partition plate and the side wall, from the partition plate to the side wall, wherein the first energy storage device includes a container having a rectangular shape, wherein the container includes:
 a top surface on which a discharge vent is disposed:
 a bottom surface opposing to the top surface:
 a pair of long surfaces connecting the top surface and the bottom surface: and
 a pair of short surface connecting the top surface and the bottom surface, and wherein the first guide portion extends in the first direction and a direction which extends from the bottom surface to the top surface.

* * * * *